(No Model.)

W. S. KISINGER.
WIRE CONNECTOR.

No. 492,811. Patented Mar. 7, 1893.

Attest.
James Moore
J. W. Layman

Inventor.
William S. Kisinger.
by James H. Layman.
Atty.

THE NORRIS PETERS CO., PHOTO-LITHO., WASHINGTON, D. C.

UNITED STATES PATENT OFFICE.

WILLIAM S. KISINGER, OF BELLEVUE, KENTUCKY.

WIRE-CONNECTOR.

SPECIFICATION forming part of Letters Patent No. 492,811, dated March 7, 1893.

Application filed September 9, 1892. Serial No. 445,416. (No model.)

*To all whom it may concern:*

Be it known that I, WILLIAM S. KISINGER, a citizen of the United States, residing at Bellevue, in the county of Campbell and State of Kentucky, have invented certain new and useful Improvements in Couplings for Wires, &c.; and I do hereby declare the following to be a full, clear, and exact description of the invention, reference being had to the annexed drawings, which form part of this specification.

My invention comprises a coupling which has been designed more especially for the expeditious joining together of broken ends of service wires for electric railways &c., although the device may be used for various other purposes, such as fastening rods, shafts &c., the details of said coupling and the method of applying it being hereinafter more fully described.

Figure 1:
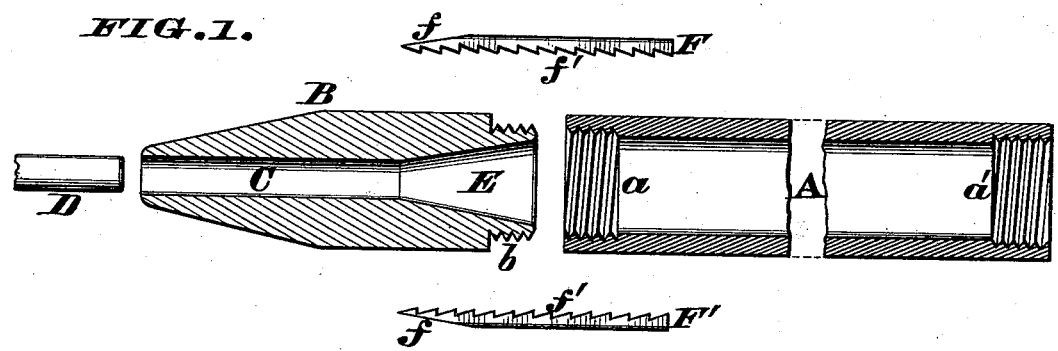
Figure 2:
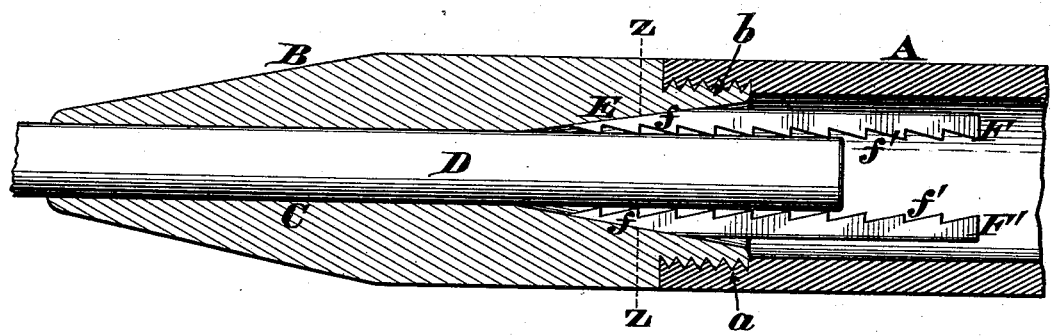
Figure 3:
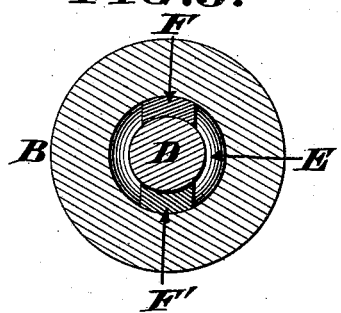
Figure 4:
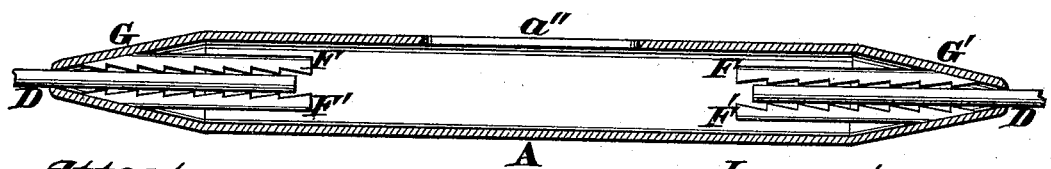

In the annexed drawings, Figure 1 is an axial section showing the different members of my coupling detached from each other. Fig. 2 is a similar section, but on an enlarged scale, of a complete coupling. Fig. 3 is a transverse section thereof at the line Z—Z. Fig. 4 is an axial section of a modification of my invention.

The central, or principal member of the coupling, is a metallic tube A, from one to two feet in length, more or less, and of such a diameter as circumstances may suggest, the ends of said tube being screw threaded internally at $a, a'$.

B is a sleeve, having at one end an external thread $b$, and at the other end, a smooth cylindrical-bore C, capable of admitting a wire, rod, or shaft D, according to the use the coupling is put to. Bore C communicates with a socket E, flaring toward the threaded end of the sleeve.

F. F'. represent a pair of hard-metal keys, usually of steel, the outer edges of said keys being tapered off, as far as may be required, as seen at $f$, while their inner edges have ratchet-shaped teeth $f'$.

The method of applying my coupling is, as follows. The various members of the coupling being detached from each other, as seen in Fig. 1, the wire, rod or shaft D is first slipped into the bore C, of sleeve B, and passed through the latter a sufficient distance to enable a secure hold of the keys on said wire. Usually, the wire is inserted about as far as seen in Fig. 2, and then the keys F. F'. are applied to the opposite sides of said wire, and their tapering portions $f. f.$ caused to bear against the sloping surface of socket E. Sleeve B is now screwed into the tube A, and the coupling at one end is complete, the connection at the other end of said tube being effected in a precisely-similar manner.

From the above description it is evident any attempt to disengage the wire D from the sleeve B will simply cause the tapering portions $f. f.$ of the keys to wedge all the tighter against the inclined surface of socket E, thereby forcing the teeth $f', f'$, into the wire and rendering it impossible to detach the latter until said sleeve is intentionally unscrewed from the tube. When this is done, said keys can be readily withdrawn at the mouth of the socket, and then the wire can be pulled directly out of the bore C. It will thus be seen that my coupling enables the expeditious joining together of broken ends of any electric-conductor, and when wires are fastened in this manner, the tube A offers no obstruction to trolley-wheels or other disks having rolling contact with such conductors.

In the modification of my invention, seen in Fig. 4, the sleeve is omitted, and the ends of tube A converge at G, G', which converging portions serve as bearings for the keys F, F', to wedge against, the keys being applied and removed through a longitudinal slot $a''$, in the upper side of said tube, although a pair of such slots may be made in the member A, if desired.

This form of coupling is not so conveniently applied as the construction seen in the other illustrations, but in many cases it will be preferred, on the ground of cheapness and simplicity.

I claim as my invention—

1. The combination, in a coupling for wires &c., of a tube having converging ends, and a set of bodily-detachable keys whose outer edges are tapered and their inner edges provided with teeth, for the purpose described.

2. The combination, in a coupling for wires &c., of the tube A, screw threaded at $a$, the sleeve B, screw threaded at $b$ and having a bore C communicating with the flaring socket E, and the bodily-detachable keys F, F', whose outer edges taper at $f. f.$ and their inner have teeth $f'. f'.$ for the purpose described.

In testimony whereof I affix my signature in presence of two witnesses.

WILLIAM S. KISINGER.

Witnesses:
  JAMES H. LAYMAN,
  ARTHUR MOORE.